US010032199B2

(12) United States Patent
Cragun et al.

(10) Patent No.: US 10,032,199 B2
(45) Date of Patent: *Jul. 24, 2018

(54) AGGREGATION OF MULTIPLE MEDIA STREAMS TO A USER

(71) Applicant: International Business Machines Corporation, Armonk, NY (US)

(72) Inventors: Brian J. Cragun, Rochester, MN (US); Zachary A. Garbow, Rochester, MN (US); Kevin G. Paterson, San Antonio, TX (US); Candace T. Pederson, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1515 days.

This patent is subject to a terminal disclaimer.

(21) Appl. No.: 13/708,646

(22) Filed: Dec. 7, 2012

(65) Prior Publication Data

US 2013/0097642 A1  Apr. 18, 2013

Related U.S. Application Data

(62) Division of application No. 11/563,794, filed on Nov. 28, 2006, now Pat. No. 8,812,637.

(51) Int. Cl.
*H04N 21/8405* (2011.01)
*H04N 21/2668* (2011.01)
(Continued)

(52) U.S. Cl.
CPC ..... *G06Q 30/0621* (2013.01); *G06Q 30/0603* (2013.01); *H04N 5/765* (2013.01);
(Continued)

(58) Field of Classification Search
CPC ............... H04N 5/765; H04N 21/2665; H04N 21/8405; G06Q 30/0603; G06Q 30/0621
(Continued)

(56) References Cited

U.S. PATENT DOCUMENTS 5,729,471 A   3/1998 Jain et al.
5,745,126 A   4/1998 Jain et al.
(Continued)

FOREIGN PATENT DOCUMENTS

WO   99/12349 A1   3/1999

OTHER PUBLICATIONS

Nahrstedt et al., "Hourglass multimedia content and service composition framework for smart room environments," Pervasive and Mobile Computing I, Dec. 31, 2005, available online at www.sciencedirect.com.
(Continued)

*Primary Examiner* — Minh Chau Nguyen
(74) *Attorney, Agent, or Firm* — Martin & Associates, LLC; Derek P. Martin

(57) ABSTRACT

A media stream aggregation mechanism receives and analyzes multiple media streams and creates an aggregate media stream output based on user preferences. In this manner a media provider that uses the media stream aggregation mechanism potentially may provide a customized presentation to each user based on user preferences. By providing the aggregation of multiple media streams to a user, the user's experience is customized according to user preferences.

2 Claims, 8 Drawing Sheets

(51) Int. Cl.
  *H04N 21/234* (2011.01)
  *G06Q 30/06* (2012.01)
  *H04N 5/765* (2006.01)
  *H04N 21/258* (2011.01)
  *H04N 21/2665* (2011.01)

(52) U.S. Cl.
  CPC . *H04N 21/23418* (2013.01); *H04N 21/25808* (2013.01); *H04N 21/25891* (2013.01); *H04N 21/2665* (2013.01); *H04N 21/2668* (2013.01); *H04N 21/8405* (2013.01)

(58) Field of Classification Search
  USPC .................................................. 709/220–223
  See application file for complete search history.

(56) References Cited

U.S. PATENT DOCUMENTS

| | | | |
|---|---|---|---|
| 5,757,784 A | 5/1998 | Liebowitz et al. | |
| 5,792,471 A | 8/1998 | Curatolo | |
| 5,884,042 A * | 3/1999 | Winter | G06F 17/30017 348/262 |
| 6,032,156 A | 2/2000 | Marcus | |
| 6,061,056 A | 5/2000 | Menard et al. | |
| 6,412,008 B1 | 6/2002 | Fields et al. | |
| 6,434,747 B1 | 8/2002 | Khoo et al. | |
| 6,460,036 B1 | 10/2002 | Herz | |
| 6,647,425 B1 | 11/2003 | Chaddha | |
| 6,782,550 B1 | 8/2004 | Cao et al. | |
| 6,816,909 B1 | 11/2004 | Chang et al. | |
| 6,865,600 B1 | 3/2005 | Brydon et al. | |
| 6,957,446 B2 | 10/2005 | Rhee | |
| 7,017,120 B2 | 3/2006 | Shnier | |
| 7,069,573 B1 | 6/2006 | Brooks et al. | |
| 7,177,872 B2 * | 2/2007 | Schwesig | G11B 27/031 709/213 |
| 7,325,043 B1 | 1/2008 | Rosenberg et al. | |
| 7,383,229 B2 | 6/2008 | Jacoby | |
| 7,424,677 B2 | 9/2008 | Sezan et al. | |
| 8,087,996 B2 * | 1/2012 | Walker | G07F 17/32 463/13 |
| 8,180,904 B1 * | 5/2012 | Albanese | H04L 12/5692 709/228 |
| 2001/0014876 A1 * | 8/2001 | Miyashita | G06Q 30/02 705/37 |
| 2002/0052788 A1 * | 5/2002 | Perkes | G06Q 20/10 705/14.23 |
| 2002/0120925 A1 | 8/2002 | Logan | |
| 2003/0067554 A1 | 4/2003 | Klarfield et al. | |
| 2003/0191826 A1 | 10/2003 | Bellinger et al. | |
| 2004/0003398 A1 * | 1/2004 | Donian | G06F 21/10 725/34 |
| 2004/0221018 A1 * | 11/2004 | Ji | G06Q 20/1235 709/217 |
| 2005/0049971 A1 * | 3/2005 | Bettinger | G06Q 30/02 705/51 |
| 2005/0193421 A1 | 9/2005 | Cragun | |
| 2007/0038931 A1 * | 2/2007 | Allaire | G06Q 30/0239 715/206 |
| 2007/0044133 A1 * | 2/2007 | Hodecker | H04N 7/17336 725/117 |
| 2007/0240183 A1 | 10/2007 | Garbow et al. | |

OTHER PUBLICATIONS

Yu et al., "AVPUC: Automatic Video Production with User Customization", Jan. 2005, pp. 203-215, <http://spiedl.aip.org/getpdf/serviel/getPDFServlet?filetype=pdf&id=PSISDG005680000001000203000001&idtype=cvips&prog=normal>.

* cited by examiner

Media Stream Characteristics 123

| Native Info from Media Source | Media quality, minimum segment length, device type, etc. |
|---|---|
| Media Content | Device location, orientation, event, etc. |
| Person Providing Media | Reputation, subscribers, username/authentication, etc. |
| Interoperability Between Media Clips | Transitions between clips, audio capabilities, digital effects, etc. |
| User Tags | (Need examples) |

FIG. 3

User Preferences 125

| Specifications and Filters for Media Stream Characteristics |
|---|

FIG. 4

Video Stream Characteristics

| Username/password | ZAG/hizack |
|---|---|
| Device and data type | Phone, streaming video |
| Minimum Segment Length | 20 seconds |
| Media Quality | 1 Mpxl |
| Event | Vikings/Packers game |
| Location | 40 yd line, East side, row 18 |

Media Content Specification

| Username/password | ZAG/hizack |
|---|---|
| Device and data type | Phone, streaming video |
| Media Quality | 1 Mpxl |
| Event Type | Football games |
| Rating | Family |
| Field Views | 80% |
| Fan Views | 10% |
| Other Views | 10% |

AGGREGATION OF MULTIPLE MEDIA STREAMS TO A USER

BACKGROUND

1. Technical Field

This disclosure generally relates to the playing of media, and more specifically relates to ways for aggregating multiple media streams to a user to provide a custom media experience according to specified user preferences.

2. Background Art

Television networks often provide coverage for many large-scale events, such as sporting events or concerts. The viewer of a television event can only view the camera views the television network decides to broadcast. There is no choice of different views or perspectives according to user preferences. The user is basically stuck with the presentation of the event that the television network provides. Without a way to customize the presentation of an event according to user preferences, viewers of the event will not have a choice to receive a customized media stream, but will be stuck with the single universal presentation that is broadcast to all subscribers of the network that is broadcasting the event.

BRIEF SUMMARY

A media stream aggregation mechanism receives and analyzes multiple media streams and creates an aggregate media stream output based on user preferences. In this manner a media provider that uses the media stream aggregation mechanism potentially may provide a customized presentation to each user based on user preferences. By providing the aggregation of multiple media streams to a user, the user's experience is customized according to user preferences.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and:

FIG. 3 is a sample table showing sample media stream characteristics;

FIG. 4 is a sample table showing a general representation of user preferences;

DETAILED DESCRIPTION

Media sources are becoming more available in modern society. Cell phones may contain digital cameras for taking still-shot pictures. Cell phones with video capability are now starting to appear. In addition, digital cameras that allow taking video may soon develop the capability of transmitting a real-time video stream. In the not-too-distant future, it is conceivable that spectators at a large-scale even such as a concert or sporting event could provide hundreds or even thousands of different media streams.

The claims and disclosure herein allow a custom media stream to be presented to a user based on the user's specified preferences. The custom media stream is constructed by a media stream aggregation mechanism that receives and analyzes multiple input media streams, and aggregates these multiple input media streams into a single output media stream to the user based on the characteristics of the incoming media streams and the user's preferences. The result is a custom media experience for the user.

Figure 1:
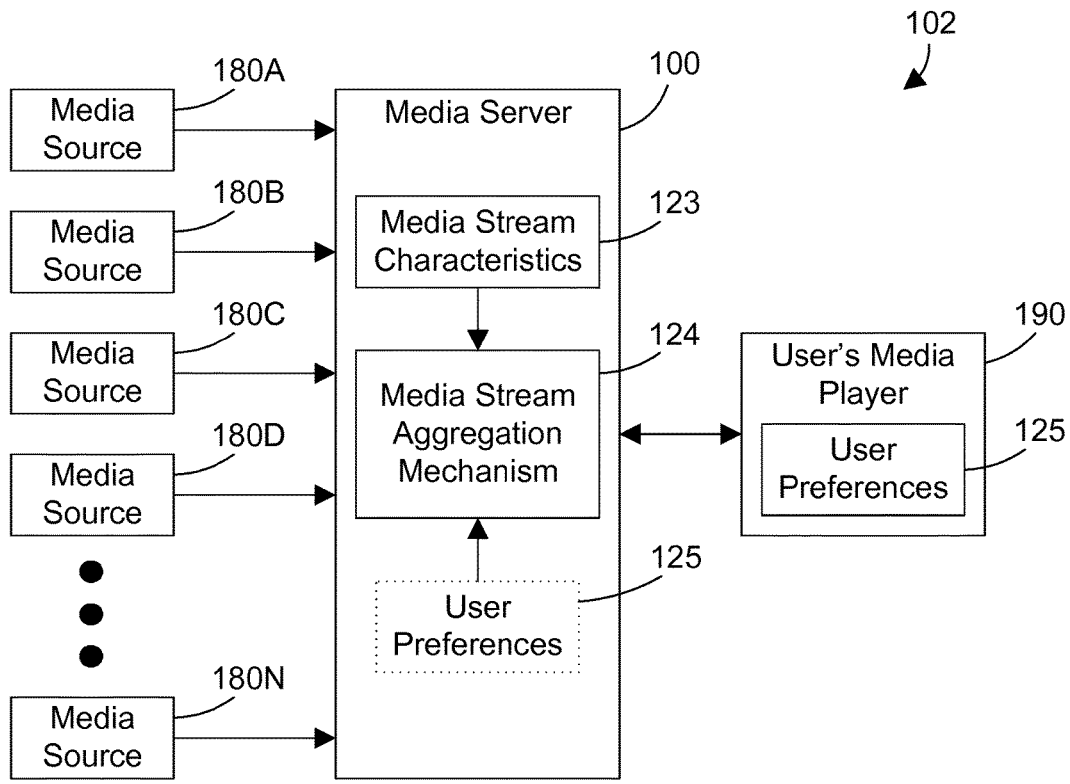
FIG. 1 is a block diagram of a media server computer system that receives multiple media streams from multiple media sources and aggregates the multiple media streams into a single output stream for the user's media player.

Referring to FIG. 1, a system 102 is shown to include a media server 100 that receives media streams from multiple media sources, shown in FIG. 1 as media sources 180A, 180B, 180C, 180D, . . . , 180N. The media server 100 includes media stream aggregation mechanism 124 that receives media stream characteristics 123 from the incoming media streams, optionally analyzes the incoming media streams for additional information, and constructs a single output stream to the user based on user preferences 125. Note that the user preferences 125 shown in the media server 100 is shown in phantom to indicate the user preferences 125 are preferably received from the user preferences 125 in the user's media player 190.

Figure 2:
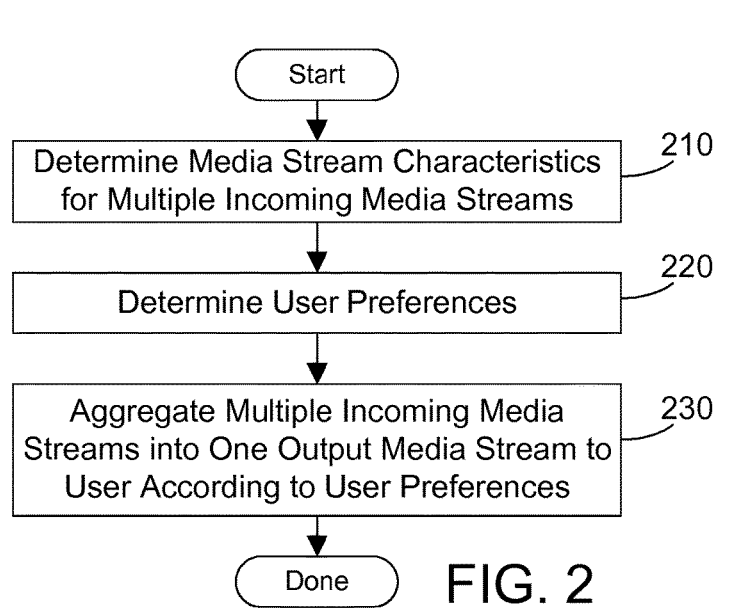
FIG. 2 is a flow diagram of a method for aggregating multiple media streams to a user according to user preferences.

Referring to FIG. 2, a method 200 is preferably performed by the media stream aggregation mechanism 124 in FIG. 1. Method 200 begins by determining media stream characteristics for multiple incoming media streams (step 210). The user's preferences are determined (step 220), and multiple incoming media streams are then aggregated into one output media stream to the user according to the user preferences (step 230).

In the disclosure and claims herein, a discussion of the aggregation of multiple media streams into a single media stream does not mean that only one media stream is being produced by the media stream aggregation mechanism 124. To the contrary, the media stream aggregation mechanism 124 may output multiple streams to multiple different users. In addition, the media stream aggregation mechanism 124 may output multiple output streams to the same user, where one or more the multiple output streams comprises an aggregate media stream created from two or more of the incoming media streams. Thus, the user could be watching a television program on the main picture with two other streams providing audio and video for two additional boxes (picture-in-picture), and any one, two or all three of these video presentations could comprise an aggregate media stream created from two or more of the incoming media streams. Any or all three of these could be a "single stream" that was constructed from multiple input streams. The disclosure and claims herein expressly extend to the aggregation of multiple media sources into a single media stream or into multiple media streams.

Referring to FIG. 3, a table is shown to include some known media stream characteristics 123. Media stream characteristics 123 are preferably determined from metadata embedded within the media stream, but some of the media stream characteristics could be determined by analyzing the incoming media stream. Media stream characteristics 123 shown in FIG. 3 include native information from the media source, such as the media quality, minimum segment length, device type, etc. Media stream characteristics 123 may also include a specification of the media content, such as the device location, orientation, event, etc. Media stream characteristics 123 may also include information regarding the person providing the media, including the reputation, subscribers, username/authentication, etc. Media stream characteristics 123 may also include information regarding the interoperability between media clips, such as the transitions between clips, audio capabilities, digital effects, etc. The media stream characteristics 123 may also include user tags that may be automatically inserted into the media stream or that the user can manually add after the media stream is created. Examples of user tags for a football game could include: football, parade, band, play, cheerleaders, mascot, replay, slowmotion, etc. A variety of other user tags could be defined for different types of events, all of which are within the scope of the disclosure and claims herein. Tags help media providers classify content such that multiple streams can be prioritized based on the provider's description of content in the tags. By marking portions of the media stream with user tags, the user tags may then be used by the media stream aggregation mechanism 124 in generate an aggregate media stream from multiple input media streams. Note that media stream characteristics 123 may include other items not shown in FIG. 3, and broadly include any information that characterizes a media stream, whether currently known or developed in the future.

FIG. 4 shows user preferences 125, which may include any specification or filter for media stream characteristics. Thus, if a user specifies a minimum resolution of 1 megapixel (Mpxl), the media stream aggregation mechanism 124 will not use any media streams that have a resolution less than 1 Mpxl in constructing the aggregate media stream for the user. Virtually any and all media stream characteristics 123 could have corresponding user preferences.

Figure 5:
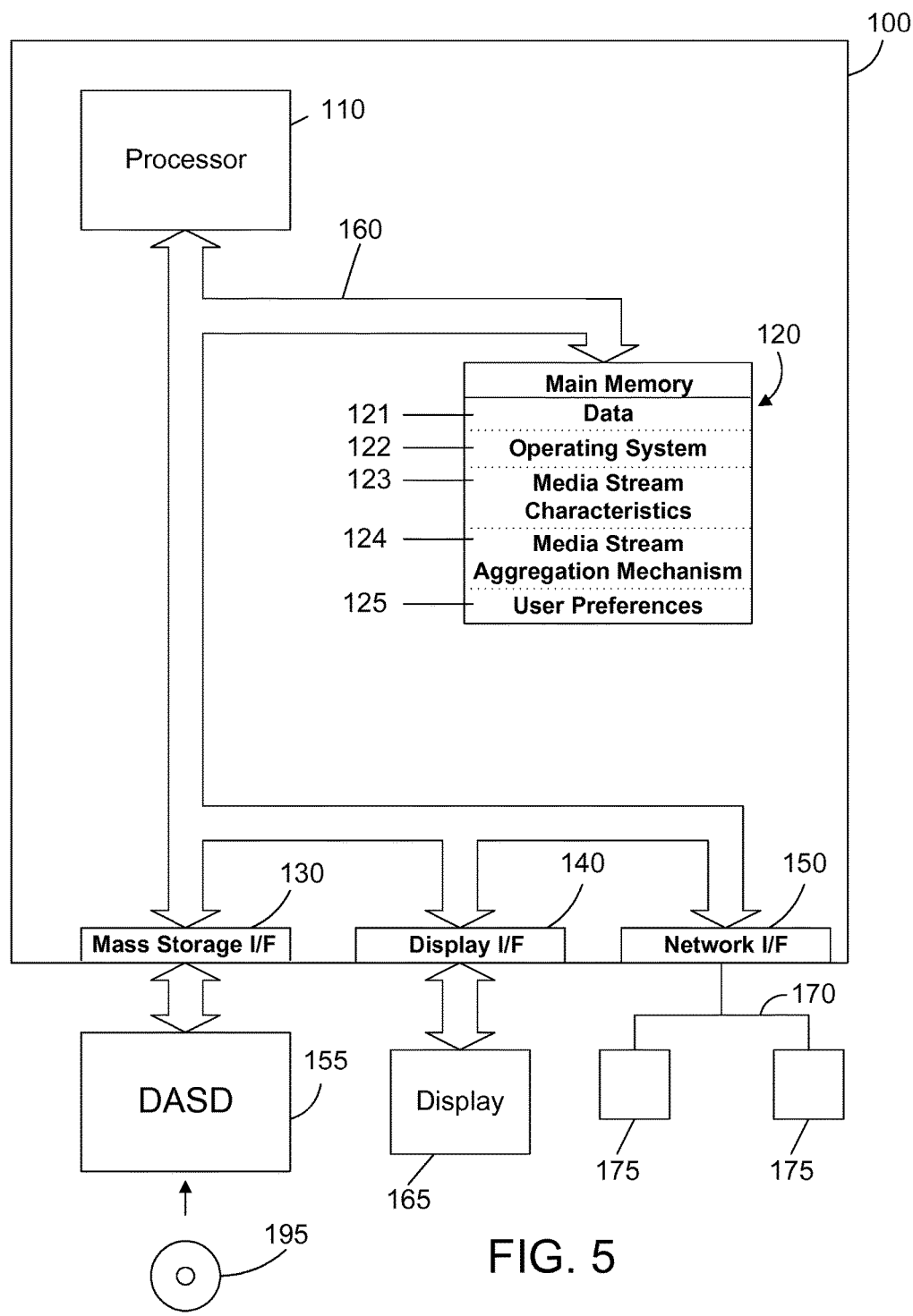
FIG. 5 is a block diagram of a suitable computer system that could serve as the media server 100 shown in FIG. 1.

Referring to FIG. 5, a computer system 100 is one suitable implementation of a computer system apparatus that includes a media stream aggregation mechanism that creates a custom media stream for a user based on the user preferences. Computer system 100 is an IBM eServer System i computer system. However, those skilled in the art will appreciate that the disclosure herein applies equally to any computer system, regardless of whether the computer system is a complicated multi-user computing apparatus, a single user workstation, or an embedded control system. As shown in FIG. 5, computer system 100 comprises one or more processors 110, a main memory 120, a mass storage interface 130, a display interface 140, and a network interface 150. These system components are interconnected through the use of a system bus 160. Mass storage interface 130 is used to connect mass storage devices, such as a direct access storage device 155, to computer system 100. One specific type of direct access storage device 155 is a readable and writable CD-RW drive, which may store data to and read data from a CD-RW 195.

Main memory 120 preferably contains data 121, an operating system 122, media stream characteristics 123, a media stream aggregation mechanism 124, and user preferences 125. Data 121 represents any data that serves as input to or output from any program in computer system 100. Operating system 122 is a multitasking operating system known in the industry as i5/OS; however, those skilled in the art will appreciate that the spirit and scope of this disclosure is not limited to any one operating system. The media stream characteristics 123, media stream aggregation mechanism 124, and user preferences 125 are shown in general terms in FIGS. 1-4 and associated text, and are discussed above with reference to FIGS. 1-4.

Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while data 121, operating system 122, media stream characteristics 123, media stream aggregation mechanism 124, and user preferences 125 are shown to reside in main memory 120, those skilled in the art will recognize that these items are not necessarily all completely contained in main memory 120 at the same time. It should also be noted that the term "memory" is used herein generically to refer to the entire virtual memory of computer system 100, and may include the virtual memory of other computer systems coupled to computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 122.

Although computer system 100 is shown to contain only a single processor and a single system bus, those skilled in the art will appreciate that aggregation of multiple media sources to a user based on the user's preferences may be practiced using a computer system that has multiple processors and/or multiple buses. In addition, the interfaces that are used preferably each include separate, fully programmed microprocessors that are used to off-load compute-intensive processing from processor 110. However, those skilled in the art will appreciate that these functions may be performed using I/O adapters as well.

Display interface 140 is used to directly connect one or more displays 165 to computer system 100. These displays 165, which may be non-intelligent (i.e., dumb) terminals or fully programmable workstations, are used to provide system administrators and users the ability to communicate with computer system 100. Note, however, that while display interface 140 is provided to support communication with one or more displays 165, computer system 100 does not necessarily require a display 165, because all needed interaction with users and other processes may occur via network interface 150.

Network interface 150 is used to connect computer system 100 to other computer systems, workstations or media sources (e.g., 175 in FIG. 5). Network interface 150 and network 170 broadly represent any suitable way to interconnect electronic devices, regardless of whether the network 170 comprises present-day analog and/or digital techniques or via some networking mechanism of the future. In addition, many different network protocols can be used to implement a network. These protocols are specialized computer programs that allow computers to communicate across network 170. TCP/IP (Transmission Control Protocol/Internet Protocol) is an example of a suitable network protocol.

At this point, it is important to note that while the description above is in the context of a fully functional computer system, those skilled in the art will appreciate that the media stream aggregation mechanism may be distributed as a program product in a variety of forms, and that the claims extend to all suitable types of computer-readable media used to actually carry out the distribution. Examples of suitable computer-readable media include: recordable media such as floppy disks and CD-RW (e.g., 195 of FIG. 5), and transmission media such as digital and analog communications links.

Embodiments herein may also be delivered as part of a service engagement with a client corporation, nonprofit organization, government entity, internal organizational structure, or the like. These embodiments may include configuring a computer system to perform some or all of the methods described herein, and deploying software, hardware, and web services that implement some or all of the methods described herein. These embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

An example is now presented to illustrate the function of the media aggregation mechanism when the media streams are video streams. Note the disclosure and claims herein expressly extend to any suitable media, including audio, video, still-shots, motion capture streams, action data streams, and any other form of media, whether currently known or developed in the future. An example for video streams is presented in FIGS. 6-9 as one illustrative example.

Figures 6, 7:
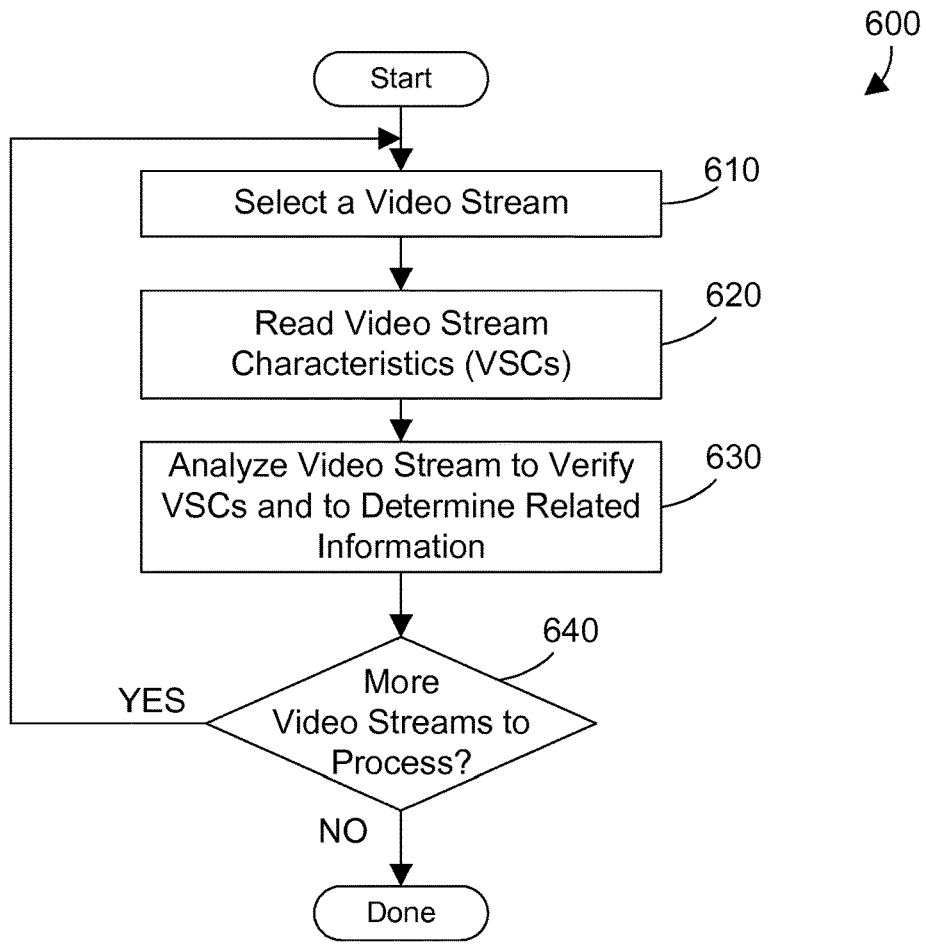
FIG. 6 is a flow diagram of a method for the media stream aggregation mechanism to receive and analyze incoming video streams for one specific example.
FIG. 7 is a sample table showing video stream characteristics for one sample incoming video stream.

Referring to FIG. 6, a method 600 begins by selecting a video stream (step 610). Characteristics of the video stream are read (step 620). The video stream characteristics are preferably metadata embedded in the video stream that describes characteristics of the video stream. The video stream is then analyzed to verify the video stream characteristics and to determine related information (step 630). The verification of the video stream characteristics is preferably an analysis of the video stream to make sure the video stream characteristics are correct. For example, if the video stream characteristics specify a 1 Mpxl resolution, and analysis of the video stream itself shows a lower resolution, the aggregation mechanism could decide not to use the video stream because it doesn't match its own video stream characteristics. This could happen, for example, if the provider forgets to change a resolution setting on the recorder before starting the recording of the event. If there are more video streams to process (step 640=YES), method 600 returns to step 610 and continues until there are no more video streams to process (step 640=NO).

Additional steps may be optionally performed during the execution of method 600 in FIG. 6. For example, the media stream aggregation mechanism 124 could provide processing or reformatting of one or more input media streams. For example, let's assume the user preferences allow the user to specify both a minimum and a maximum quality. This might be desirable based on limitations of the user's media player, for example. Input media streams that exceed the maximum quality could be reformatted to be less than or equal to the maximum quality. Other reformatting or conversions could also be performed, including stripping off video to provide only the audio portion of a video stream, mixing an audio and video stream, etc. The disclosure and claims herein extend to any suitable processing of the input media streams, including any suitable reformatting or conversion.

FIG. 7 shows a suitable example of video stream characteristics 123A that include a username and password, device and data type, minimum segment length, media quality, event, and location. For this specific example, we assume the user has a username of ZAG and a password of hizack. This username and password could be used to authenticate the video stream to the aggregation mechanism. We further assume the video device is a phone, and the data type is streaming video. The minimum segment length is 20 seconds, which means the person providing the media stream will provide video clips no shorter than 20 seconds in length. The media quality is 1 Mpxl. The event is the Vikings/Packers football game. The location is the 40 yard line, East side, row 18. These video stream characteristics allow the aggregation mechanism to determine whether the video stream may be used in constructing a customized output video stream for a user according to user preferences.

Figures 8, 9:
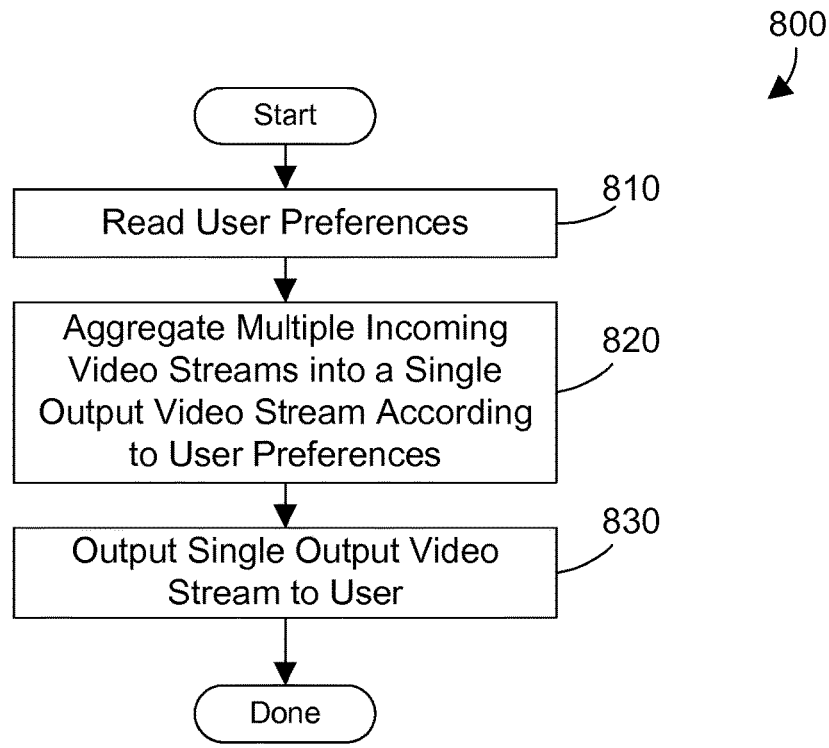
FIG. 8 is a flow diagram of a method for aggregating multiple incoming video streams into a single output video stream to a user.
FIG. 9 is a sample table showing user preferences for aggregating a plurality of input video streams.

Referring to FIG. 8, a method 800 begins by reading the user preferences (step 810). The multiple incoming video streams are then aggregated into a single output video stream according to the user preferences (step 820). The single output video stream is then output to the user (step 830). The user thus receives an output video stream that is customized to the user's tastes as indicated in the user preferences. Note that method 800 could be repeated if the user is viewing multiple video streams at one time (e.g., picture-in-picture).

An example of user preferences 125A is shown in FIG. 9. The user preferences 125A include a minimum segment length, a minimum quality, an event, and a location specification. For this specific example, the minimum segment length is 10 seconds, the minimum quality is 1 Mpxl, the event is the Vikings/Packers game, and the location is between the 30 yard lines. Note that the user preferences may include any suitable criteria or heuristic for analyzing the video stream characteristics to determine whether a video stream may be used to construct a customized output video stream according to the user's preferences. We see that the video stream characteristics 123A in FIG. 7 satisfy the user preferences 125A in FIG. 9. As a result, the video stream corresponding to the video stream characteristics 123A in FIG. 7 could be used in constructing a customized output video stream according to the user preferences 125A in FIG. 9.

Figures 10, 11:
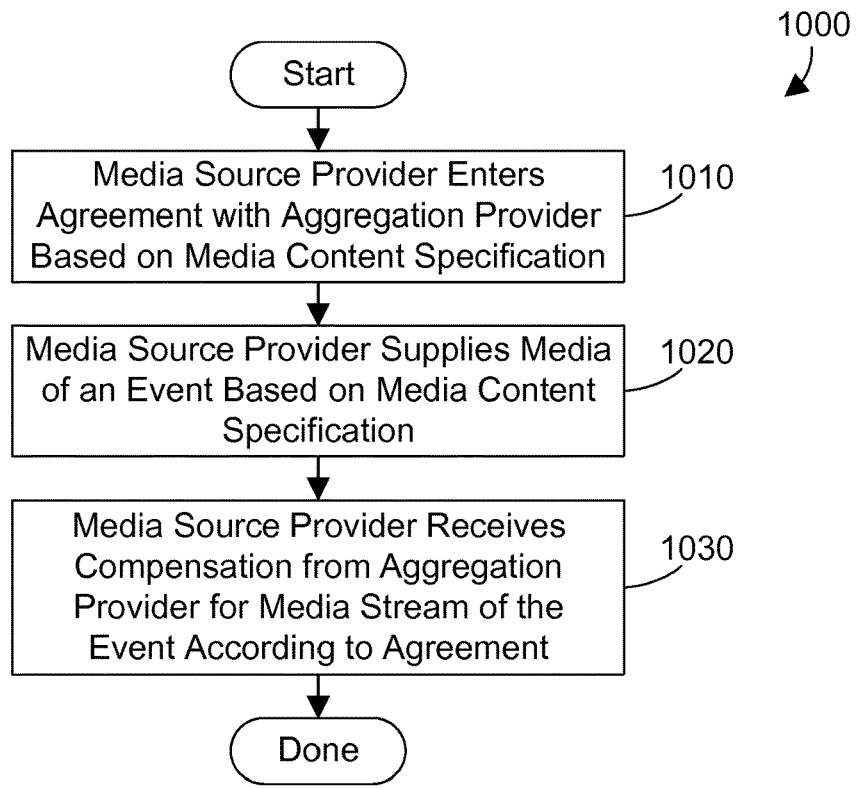
FIG. 10 is a flow diagram of a method for a media source provider to do business by providing media streams to an aggregation provider.
FIG. 11 is a sample media content specification that dictates the content provided by the media source provider referenced in FIG. 10.
Figure 12:
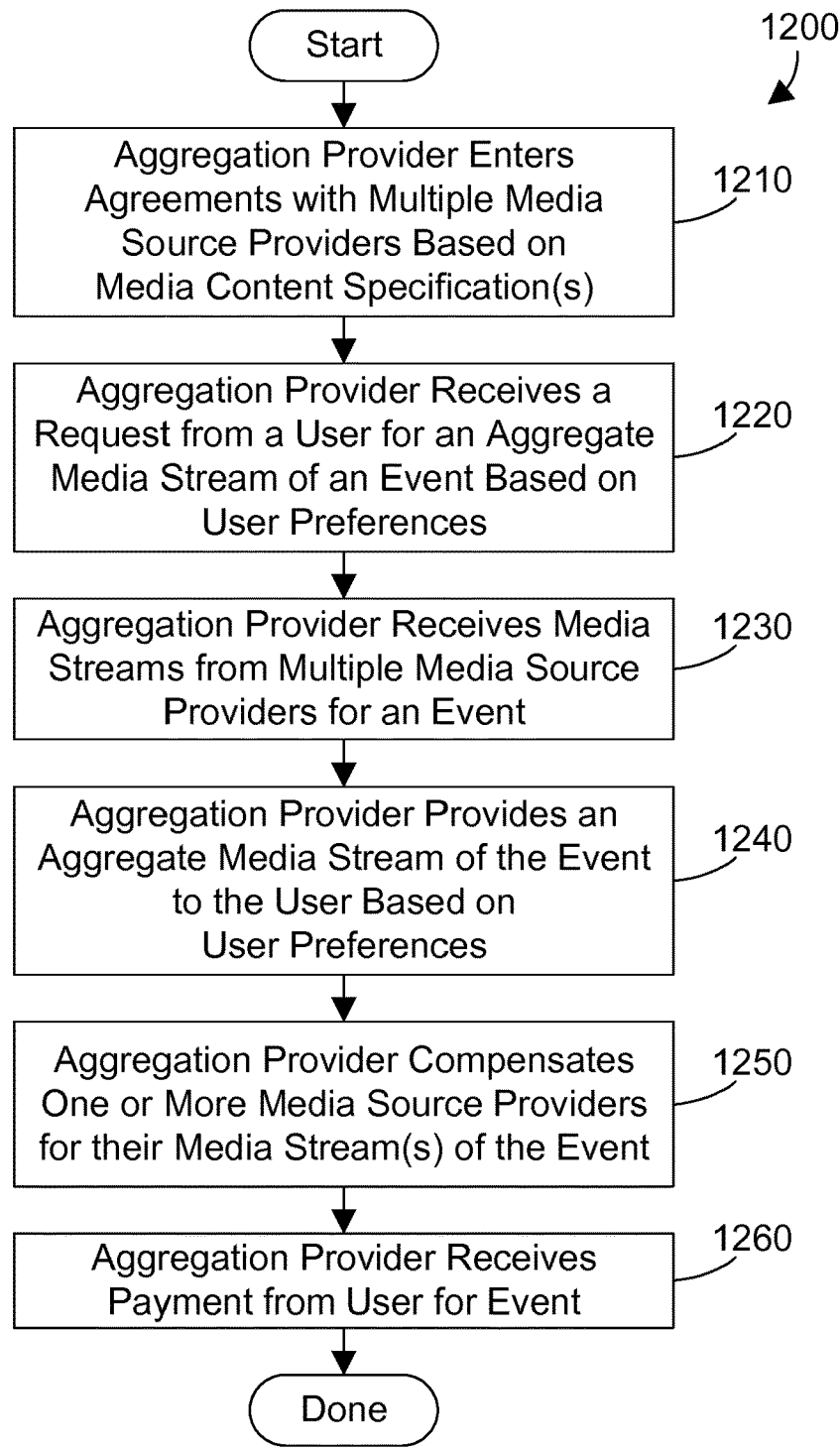
FIG. 12 is a flow diagram of a sample method for an aggregation provider to do business.

The interaction described above gives rise to methods for doing business, as shown and described in FIGS. 10-12. Referring to FIG. 10, a method 1000 for a media source provider to do business begins by the media source provider entering an agreement with an aggregation provider based on a defined media content specification (step 1010). The media source provider supplies media of an event based on the media content specification (step 1020). The media source provider then receives compensation from the aggregation provider for the media stream of the event according to the agreement (step 1030). Note that compensation may be monetary, or may be non-monetary, such as recognizing the media source provider by placing the media source provider on a list on a web site that ranks media source providers according to the number of users that received portions of the media stream provided by the media source provider. Another form of non-monetary compensation is to provide access to other streams of similar or dissimilar content under control of the media aggregator. For example, a media source provider might upload a football game to a media aggregator, and in return, the media source provide could have access to downloads of video games. The disclosure and claims herein expressly extend to all forms of compensation, both monetary and non-monetary.

A sample media content specification 123B is shown in FIG. 11 to include a username and password, device and data type, media quality, event type, rating, and different view specifications. For the specific example shown in FIG. 11, the username and password are ZAG and hizack, respectively. The device type is a phone, and the data type is streaming video. The media quality is 1 Mpxl. The event type is football games. The rating is Family, meaning the media stream will be suitable for all ages. Another rating might be Mature, where coarse yelling by fans is shown and closeups of cheerleaders are included. The field views will be approximately 80% of the video stream, with fan views occupying approximately 10% of the video stream and other views occupying approximately 10% of the video stream. Note the media content specification 123B may include some items in the media stream characteristics (e.g., shown in FIG. 3), but may also include other items, such as the view specifications shown in FIG. 11. The media content specification 123B is the specification that governs what the media source provider has agreed to provide to the aggregation provider in step 1010 in FIG. 10.

Users may submit evaluations of media source providers. Based on the user evaluations, a media source provider might attain "preferred status" that may make the media source provider eligible for monetary awards, better seats, reduced rates on the camera's wireless connection, etc. In addition, the user evaluations can also negatively affect the status of the media source provider. Thus, a media source provider can fall from "preferred status" if the evaluations of the media source provider are negative.

Referring to FIG. 12, a sample method 1200 for an aggregation provider to do business begins by the aggregation provider entering agreements with multiple media source providers based on one or more media content specifications (step 1210). The aggregation provider receives a request from a user for an aggregate media stream of an event based on user preferences defined by the user (step 1220). The aggregation provider then receives media streams from multiple media source providers for an event (step 1230). The aggregation provider provides an aggregate media stream of the event to the user based on user preferences (step 1240). The aggregation provider then compensates one or more media source providers for their media stream(s) of the event (step 1250). As before, this compensation may be monetary or non-monetary. The aggregation provider may optionally receive payment from the user for the event (step 1260). In the alternative, the aggregation provider may provide this service for free, of as part of a package for which the user already pays.

Figure 13:
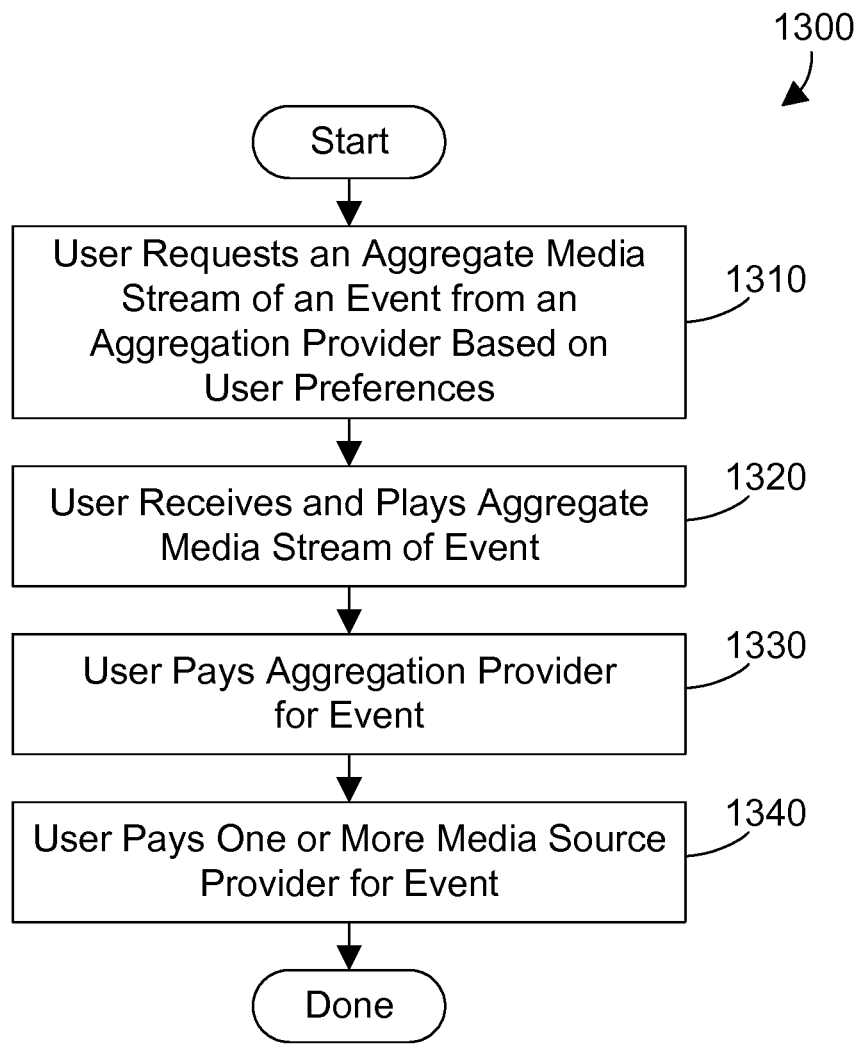
FIG. 13 is a flow diagram of a sample method for a user to do business with an aggregation source provider that aggregates multiple media streams to the user.

Referring to FIG. 13, a method for a user to receive and play an aggregate media stream of an event begins by the user requesting an aggregate media stream of an event from an aggregation provider based on user preferences specified by the user (step 1310). The user receives the aggregate media stream of the event from the aggregation provider and plays the aggregate media stream (step 1320). An optional step is for the user to pay the aggregation provider for the event (step 1330). Step 1330 is not optional in the sense that a user may decide not to pay, but is optional from the point of view of the aggregation provider. In other words, the aggregation provider may decide to charge users for an aggregate (i.e., customized) media stream of an event on a pay-per-view basis, or could supply the aggregate media stream as part of an existing cable or satellite package to which the user already subscribes. Another optional step is for the user to pay one or more media source providers for their contribution to the user's customized media stream (step 1340). The amount the user pays each media source provider may depend on many factors, including the proportion of the customized media stream provided by the media stream provider, the quality of the provider's media stream, the popularity of the media source provider, the bandwidth of the media source provider, etc. Note the payments to the aggregation provider and/or media source providers may be micropayments of less than one dollar. In the alternative, a fixed price for a pay-per-view event could be apportioned on a percentage basis to the various media source providers that contributed to the user's customized media stream.

The aggregation of media streams may be done real-time, but this requires significant processing power in the media server 100 to process the many media streams real-time and provide a real-time aggregate media stream. One way to ease the processing burden of analyzing the input media streams in real-time is to not perform real-time analysis of the stream, but to aggregate the input media streams based only on the media source provider's profile. Other alternatives may also be used that do not process the media streams real-time. For example, media could be streamed to a digital video recorder (DVR) in less-than-real-time for later viewing. In addition, a library of media streams of a past event could be stored on a web site, and a custom media stream could be created on-demand when the user requests the custom media stream and sends the user preferences.

The custom (i.e., aggregate) media stream may also include other optional effects. For example, the pace of the stream's change to different media sources can be customized to fit particular music or content of the media itself, similar to a highlight reel. In addition, a conglomeration of video feeds could be integrated together to create a wrap-around view of a particular event. For example, if more than a thousand people all with camera phones are snapping still shots of a batter in a baseball game, the media server could aggregate the still shots from various locations to create a wrap-around video view of the batter at the moment he hit a home run.

The apparatus, program product, and methods herein allow receiving media streams for an event from multiple sources, processing the media streams, and generating an aggregate media stream from the multiple media streams according to user preferences. The result is the user receives a customized media stream of an event that better suits the user's preferences for viewing the event. By providing a customized viewing experience, the user's experience in viewing the event is enhanced. In addition, the aggregation provider may generate additional revenues by providing customized media streams to users according to their specified preferences.

Note that the term "media stream" as used herein includes any suitable digital data, including data that is not video or audio data. For example, statistics, scores, or other digital data could be provided in an input media stream. Such digital data could be combined with other media streams to enhance the aggregate media stream to the user. Thus, streams may be combined, altered, adjusted, improved, enhanced, superimposed, partially delayed, cropped, analyzed, etc. For example, a line marking the location of a first down on the football field could be superimposed on a video stream to the user. Another example would allow multiple audio fees to be combined so the user hears the cheering from the cheerleaders and the band at the same time. This would also allow multiple microphones in the helmets of the players to be combined so the user hears the comments from many players at once. In addition, the aggregate media stream to the user may include overlapping portions or enhancements. For example, the user could select video and audio from various feeds, but could also elect to superimpose commentator audio.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

The invention claimed is:

1. A method for an aggregation provider to provide an aggregated media stream to a user, the method comprising the steps of:

a media source provider that has a portable media source agreeing with the aggregation provider to provide a media stream from the portable media source that satisfies a media content specification that specifies how the media source provider provides the media stream of a live televised event, wherein the media content specification comprises device type of the portable media source, data type generated by the portable media source, media quality that specifies minimum resolution of the media stream generated by the portable media source, event type of the live televised event, and a plurality of views that each specify a direction for pointing the portable media source when generating the media stream of the live televised event;

the media source provider supplying the media stream of the live televised event to the aggregation provider based on the media content specification;

the aggregation provider analyzing embedded metadata in the media stream received from the media source provider, and determining based on the embedded metadata whether the media stream satisfies the media content specification;

when the media stream received from the media source provider does not satisfy the media content specification, not using the media stream in the aggregated media stream;

when the media stream received from the media source provider satisfies the media content specification, using at least a portion of the media stream in the aggregated media stream; and sending the aggregated media stream to the user.

2. A method for a media aggregation provider to provide an aggregated media stream to a user, the method comprising the steps of:

agreeing with a plurality of media source providers to receive a plurality of media streams of a live televised event from a plurality of media sources controlled by the plurality of media source providers based on a media content specification that comprises device type of the portable media source, data type generated by the portable media source, media quality that specifies minimum resolution of the media stream generated by the portable media source, event type of the live televised event, and a plurality of views that each specify a direction for pointing the portable media source when generating the media stream of the live televised event;

receiving a request from the user for the aggregated media stream of the live televised event based on user preferences specified by the user, wherein the user preferences including minimum segment length, minimum quality, event, and location that specifies a point of view;

receiving at least two media streams for the live televised event from at least two of the plurality of media sources;

analyzing embedded metadata in each of the at least two media streams to determine based on the embedded metadata which of the at least two media streams satisfy the media content specification;

for each of the at least two media streams that satisfy the media content specification, processing the at least two media streams that satisfy the media content specification and generating therefrom the aggregated media stream according to media stream characteristics that include information regarding each of the plurality of media streams and according to the user preferences sending the aggregated media stream to the user.

* * * * *